(12) United States Patent
Haggar et al.

(10) Patent No.: US 9,811,241 B2
(45) Date of Patent: Nov. 7, 2017

(54) SHARED INTER-OPERATIONAL CONTROL AMONG MULTIPLE COMPUTING DEVICES

(71) Applicant: International Business Machines Corporation, Armonk, NY (US)

(72) Inventors: Peter F. Haggar, Raleigh, NC (US); Jacqueline G. Rojanatavorn, Raleigh, NC (US); Steven K. Speicher, Holly Springs, NC (US); Scott A. Will, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 369 days.

(21) Appl. No.: 14/488,952

(22) Filed: Sep. 17, 2014

(65) Prior Publication Data

US 2016/0077706 A1    Mar. 17, 2016

(51) Int. Cl.
*G06F 3/14*      (2006.01)
*G06F 3/0482*    (2013.01)
(Continued)

(52) U.S. Cl.
CPC ............ *G06F 3/0482* (2013.01); *G06F 3/038* (2013.01); *G06F 3/0484* (2013.01);
(Continued)

(58) Field of Classification Search
CPC .. H04N 21/252; H04N 21/258; G06Q 10/101; G06Q 10/103; G06T 2219/024; H04W 4/008; H04B 5/00; H04B 3/00
(Continued)

(56) References Cited

U.S. PATENT DOCUMENTS 5,841,435 A    11/1998  Dauerer et al.
7,774,211 B1    8/2010  Mullen et al.
(Continued)

FOREIGN PATENT DOCUMENTS

EP      1450266 A1    8/2004
WO   2006085269 A1    8/2006
(Continued)

OTHER PUBLICATIONS

IBM, List of IBM Patents or Patent Applications Treated as Related, Applicant Appendix, Jun. 16, 2015, pp. 1-2, the contents of which are incorporated herein by reference in their entirety.
(Continued)

*Primary Examiner* — Ruay Ho
(74) *Attorney, Agent, or Firm* — Lee Law, PLLC; Christopher B. Lee

(57) ABSTRACT

A collaborative computing device group operative under a shared multiple discrete desktop user interface is established from a first desktop of a first computing device and a different discrete desktop of a second computing device physically located in user visual proximity to the first computing device. A color-coded graphical representation of a user-interface control port that allows authorized cursor navigation to and from the second computing device is displayed on the first desktop oriented in a respective direction of the second computing device. A cursor of the second computing device is authorized to migrate, under control of a user of the second computing device, from the different discrete desktop through the color-coded graphical representation of the user-interface control port of the second computing device to the first desktop and the first computing device is controlled in accordance with visual navigation and control of the cursor of the second computing device.

10 Claims, 8 Drawing Sheets

(51) Int. Cl.
- G06F 3/0484 (2013.01)
- H04L 12/18 (2006.01)
- H04L 29/06 (2006.01)
- H04L 29/08 (2006.01)
- G06F 3/038 (2013.01)

(52) U.S. Cl.
CPC ............ *G06F 3/04842* (2013.01); *G06F 3/14* (2013.01); *H04L 12/1822* (2013.01); *H04L 65/403* (2013.01); *H04L 67/141* (2013.01); *H04L 67/18* (2013.01); *H04L 67/303* (2013.01); *G06F 2203/0383* (2013.01)

(58) Field of Classification Search
USPC ........................................................ 715/807
See application file for complete search history.

(56) References Cited

U.S. PATENT DOCUMENTS

| | | | |
|---|---|---|---|
| 8,271,887 | B2 | 9/2012 | Offer et al. |
| 2003/0204574 | A1 | 10/2003 | Kupershmidt |
| 2004/0098458 | A1* | 5/2004 | Husain ............... H04L 41/0803 709/204 |
| 2006/0285150 | A1 | 12/2006 | Jung et al. |
| 2009/0062931 | A1 | 3/2009 | Keyes, IV et al. |
| 2010/0318921 | A1 | 12/2010 | Trachtenberg et al. |
| 2011/0197147 | A1 | 8/2011 | Fai |
| 2011/0249024 | A1 | 10/2011 | Arrasvuori et al. |
| 2012/0167136 | A1* | 6/2012 | Yuen .................. H04N 5/44543 725/36 |
| 2012/0250858 | A1 | 10/2012 | Iqbal et al. |
| 2012/0278727 | A1 | 11/2012 | Ananthakrishnan et al. |
| 2013/0042183 | A1* | 2/2013 | Martinez ............... G06F 3/0486 715/748 |
| 2014/0129322 | A1* | 5/2014 | George ................ G06Q 30/02 705/14.45 |
| 2014/0372524 | A1* | 12/2014 | Der ....................... H04L 67/10 709/204 |

FOREIGN PATENT DOCUMENTS

| | | |
|---|---|---|
| WO | 2008043657 A1 | 4/2008 |
| WO | 2009079385 A1 | 6/2009 |
| WO | 2009114218 A2 | 9/2009 |

OTHER PUBLICATIONS

Author Unknown, Wikipedia, the free encyclopedia: Near field communication, Webpage, Sep. 15, 2014, pp. 1-16, Wikimedia Foundation, Inc., Published online at: http://en.wikipedia.org/wiki/Near_field_communication.

Author Unknown, NFC for Business: Frequently Asked Questions, Archived webpage, Latest available version dated Nov. 11, 2013, pp. 1-9, Published online at: http://web.archive.org/web/20131111135005/http://www.nfc-forum.org/resources/faqs.

Author Unknown, Method and System for Dynamic Discovery and Integration of Multiple Smart Devices into a Single Composite System, Technical Disclosure: IPCOM000223757D, Nov. 28, 2012, pp. 1-4, IP.com, Published online at: http://ip.com/pdf/ipcompad/IPCOM000223757D.pdf.

United States Patent and Trademark Office, Office Action for U.S. Appl. No. 14/719,656, dated Jun. 2, 2017, pp. 1-28, Alexandria, VA, USA.

Shahram Izadi, et al., Dynamo: A public interactive surface supporting the cooperative sharing and exchange of media, In Proceedings of the 16th Annual ACM Symposium on User Interface Software and Technology, Nov. 2-5, 2003, pp. 159-168, Association for Computing Machinery, New York, NY, USA.

United States Patent and Trademark Office, Notice of Allowance for U.S. Appl. No. 14/719,656, dated Sep. 12, 2017, pp. 1-9, Alexandria, VA, USA.

* cited by examiner

US 9,811,241 B2

SHARED INTER-OPERATIONAL CONTROL AMONG MULTIPLE COMPUTING DEVICES

BACKGROUND

The present invention relates to direct computer inter-operability among multiple distinct computing devices. More particularly, the present invention relates to shared inter-operational control among multiple computing devices.

Computing devices, such as laptops and tablets, may be utilized by users to browse websites and perform tasks as commanded by the users. Users utilize a user interface and operating system that allows the user to install programs or applications ("apps"), on the respective types of devices. The programs and apps operate under the control of and operate with respect to the single computing device upon which the programs and apps are installed.

BRIEF SUMMARY

A method includes establishing, by a processor of a first computing device, a collaborative computing device group operative under a shared multiple discrete desktop user interface comprised of a first desktop of the first computing device and a different discrete desktop of at least a second computing device physically located in user visual proximity to the first computing device; displaying, on the first desktop of the first computing device oriented in a respective direction of each of the at least second computing device relative to the first computing device, a color-coded graphical representation of a user-interface control port of each of the at least second computing device, where each respective user-interface control port allows authorized cursor navigation to and from the respective computing device; authorizing a cursor of the second computing device to migrate, under control of a user of the second computing device, from the different discrete desktop of the second computing device through the color-coded graphical representation of the user-interface control port of the second computing device to the first desktop of the first computing device; and controlling, by the processor, the first computing device in accordance with visual navigation and control of the cursor of the second computing device on the first desktop by the user of the second computing device.

A system includes a communication module of a first computing device; and a processor of the first computing device programmed to: establish, via the communication module, a collaborative computing device group operative under a shared multiple discrete desktop user interface comprised of a first desktop of the first computing device and a different discrete desktop of at least a second computing device physically located in user visual proximity to the first computing device; display, on the first desktop of the first computing device oriented in a respective direction of each of the at least second computing device relative to the first computing device, a color-coded graphical representation of a user-interface control port of each of the at least second computing device, where each respective user-interface control port allows authorized cursor navigation to and from the respective computing device; authorize a cursor of the second computing device to migrate, under control of a user of the second computing device, from the different discrete desktop of the second computing device through the color-coded graphical representation of the user-interface control port of the second computing device to the first desktop of the first computing device; and control the first computing device in accordance with visual navigation and control of the cursor of the second computing device on the first desktop by the user of the second computing device.

A computer program product includes a computer readable storage medium having computer readable program code embodied therewith, where the computer readable program code when executed on a computer causes the computer to: establish a collaborative computing device group operative under a shared multiple discrete desktop user interface comprised of a first desktop of the computer and a different discrete desktop of at least a second computing device physically located in user visual proximity to the computer; display, on the first desktop of the computer oriented in a respective direction of each of the at least second computing device relative to the computer, a color-coded graphical representation of a user-interface control port of each of the at least second computing device, where each respective user-interface control port allows authorized cursor navigation to and from the respective computing device; authorize a cursor of the second computing device to migrate, under control of a user of the second computing device, from the different discrete desktop of the second computing device through the color-coded graphical representation of the user-interface control port of the second computing device to the first desktop of the computer; and control the computer in accordance with visual navigation and control of the cursor of the second computing device on the first desktop by the user of the second computing device.

DETAILED DESCRIPTION

Figure 1:
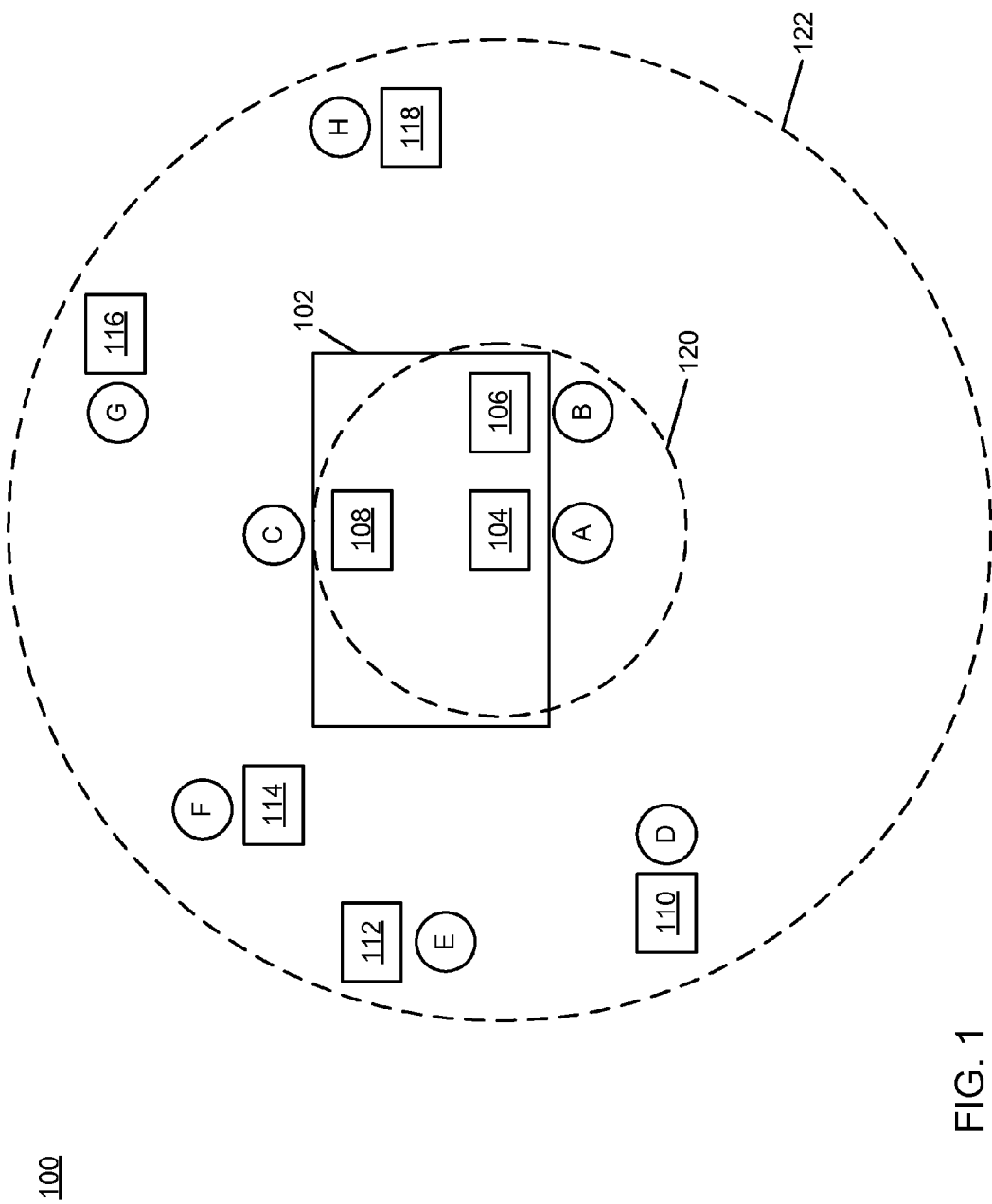
FIG. 1 is a block diagram of an example of an implementation of a collaborative environment within which shared inter-operational control among multiple computing devices may be implemented according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides shared inter-operational control among multiple computing devices. The present technology facilitates a shared collaborative user interface with communications established among multiple computing devices (e.g., laptops, tablets, etc.) that are physically closely situated such that users of the respective devices may see display screens of the other computing devices. Users may establish a collaborative computing device group operative under a shared multiple discrete desktop user interface formed from the user interfaces of the collaborating devices. Color-coded representations of user-interface control ports of each collaborating computing device may be displayed on each device that is capable of operating under the shared collaborative user interface. The respective user-interface control ports depicted by the color-coded representations each allow authorized cursor navigation (e.g., migration) to and from the respective computing device, and allow data migration (e.g., files, clipboard data, etc.) to and from the respective computing devices. The locations of the color-coded representations of the user-interface control ports of the different computing devices are directionally distributed/arranged around a perimeter of a display/desktop of each respective computing device to visually correlate the respective user-interface control ports with the respective computing devices.

Color coding identical to the representations of the respective user-interface control ports may also be applied to migrated cursors (operative by migration on other computing devices) to allow users to identify the different cursors of each collaborating computing device and to visually understand which computing device is performing a given device control operation on a given display screen. As such, users may identify their own local-device cursor as well as the cursors of other computing devices operating on their own computing device by color differentiation and/or orientation differentiation. As information is shared between each computing device, users may identify which other user is sharing content on their screen/desktop based upon the color-coded representations of the user-interface control ports of different computing devices and cursors.

As such, color coding is trajectory-like with respect to the representations of the user-interface control ports, which allows users to readily discern the locations of the respective other users/computing devices on screen. Color coding further provides visual correlation of the different cursors with the respective computing devices by use of identical color-coding for the cursors.

It should be noted that the examples herein utilizes descriptions of color coding to differentiate between aspects of different computing devices (e.g., cursors, representations of user-interface control ports, etc.). However, it should be noted that gradients of shading, different fill patterns of cross-hatching, and other forms of visually differentiating cursors may be used as appropriate for a given implementation to improve accessibility. Additionally, though "cursors" are used for purposes of example herein for navigation to and from different computing devices, it should be noted that the present technology may be applied to keyboards and/or touchpad/mouse input devices, touchscreen input devices integrated into the touchscreen displays, and other forms of input devices as appropriate for a given implementation.

The present technology utilizes native application-level operations on other devices to perform operations initiated by users of other computing devices. Users may directly control the other neighboring computing devices to perform collaboration and to copy text or files, move files, or otherwise manipulate data and files situated on neighboring computing devices. For example, as described in more detail below, where a user of one device is interested in copying a file from a neighboring computing device, the user may begin moving the user's local-device cursor across the user's computing device screen toward the respective neighboring computing device's user-interface control port representation. When the cursor is hovered over the neighboring computing device's user-interface control port representation near the edge of the user's screen, the local-device cursor may then appear on the screen of the neighboring computing device—still under the full control of the first user. The user may then perform operations, such as highlight text, select a file, press Control-C (to copy), or otherwise operate on data located on the neighboring computing device screen using the first user's own keyboard and touchpad/mouse. The user may then move the local-device cursor back to the user's own computing device screen, and then paste the text where appropriate. As such, the present technology provides improved capabilities for collaboration among coworkers or other individuals by allowing users of a given computing device to access native application-level operations of other neighboring computing devices.

The computing devices may exchange information to ensure that communication may legitimately and securely be established between the respective devices. Encrypted communications between the devices may be implemented to avoid interception of content and device control commands transferred between the devices. As such, the present technology may be implemented in a secure manner as appropriate for a given implementation.

Assuming communication is established, the "collaboration applications" wait for any event signaling that cross-machine communication is required. The collaboration applications are alternatively termed a "shared user interface" herein with the understanding that the shared user interfaces of different devices operate to integrate user interfaces of different computing devices to provide a collaborative shared working environment to enhance productivity. Network-based communications are not required for the respective devices to communicate. Bluetooth® or other technologies may be utilized to transfer control commands between computing devices, again in an encrypted or otherwise secured manner.

When an event is received/detected by one computing device (e.g., a cursor being moved onto the machine from another machine), the "receiving" computing device may grant access to the "sending" computing device's cursor to allow the neighboring computing device user to control the receiving computing device. Collaboration sessions may be configured with session permissions (e.g., session security profiles, etc.), or permissions (access) may be granted on a case-by-case basis as appropriate for the given collaboration and working environment.

Once the cursor for the "sending" computing device returns from the remote-device control, the computing devices return to a "wait" state, where the devices wait for the next collaboration event. As such, the present technology may operate in a manner that reduces processor loading of devices by invoking collaborative communications as requested by users.

The present technology allows users taking part in a multiple user desktop sharing environment to detect shared machines in proximity to one another, and organize the machines in an understandable way to make it easier for the users to determine the specific machine(s) the users are interested in interacting with. Once the shared user interface environment is activated, the present technology also allows all users to visually and rapidly determine which other user(s) in the collaborative session are performing which control actions on a given shared machine through color coding and cursor identification, as described in more detail below.

The present technology enables detection of shared machines in an area within a program window. The detection may be performed using any technology appropriate for a given implementation, including infrared, Bluetooth®, Wi-Fi®, near field communication (NFC), geofencing, or other technologies, as appropriate for a given implementation.

Detection modes include a "detect all" (detect-all) mode and "detect adjacent" (detect-adjacent) mode that allow users to share desktops in a selective manner based upon the proximity of devices. These detection modes are described in more detail below.

It should be noted that while the present technology allows for the display of all screens together as part of the shared user interface, each computing device screen is associated with its own independent computing device. As such, each display screen is a separate desktop of a separate computing device with shared access/controls being granted to input/control devices of other computing devices.

It should be noted that conception of the present subject matter resulted from recognition of certain limitations associated with collaborative environments. For example, it was observed that users of computing devices often gather to try to collaborate on ideas and that the users often need to share information or data from one computing device to another. However, it was further observed that the users must, for example, have a network connection on each computing device and must email files, which requires opening an email program and a new email, navigating to the file the user wants to send, and then sending the email, while on the receiving side, the receiving user must also open an email program, receive the email, and navigate in their system to store the respective file. In view of these observations, it was determined that the requirement of a network connection and the many steps to send and receive email communications interfered with the creative and collaborative processes. It was further determined that a shared user interface that allows users to directly navigate onto and control other computing devices to place or retrieve files would not only improve efficiency of data movement, but users may further collaborate more effectively and may do so without requiring a network connection (e.g., at a collaboration retreat without an active network or in a cafeteria with a non-secure Wi-Fi, etc.). The present subject matter improves user collaboration and efficiency by providing shared inter-operational control among multiple computing devices, as described above and in more detail below. As such, improved inter-device content sharing and control be obtained through use of the present technology.

The shared inter-operational control among multiple computing devices described herein may be performed in real time to allow prompt interaction and control between multiple co-located computing devices. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of a collaborative environment 100 within which shared inter-operational control among multiple computing devices may be implemented. A table 102 is illustrated within the collaborative environment 100. For purposes of the present example, the collaborative environment 100 may be a productivity lounge in a workplace where employees may gather to share ideas and plan innovations. A computing device 104, a computing device 106, and a computing device 108 are shown to be situated on the table 102 within the collaborative environment 100. The computing device 104 is shown to be utilized by a User A. The computing device 106 is shown to be utilized by a User B. The computing device 108 is shown to be utilized by a User C. The User A through the User C are shown gathered around the table 102 with their respective computing devices as part of a collaborative project.

Additionally, a computing device 110 through a computing device 118 are illustrated within FIG. 1 in various orientations within the collaborative environment 100 relative to additional users, represented as User D through User F, respectively. The User D through the User F represent other employees that are using the collaborate environment 100 for other projects.

As described above, the detect-adjacent mode of operation to perform shared inter-operational control among multiple computing devices may be implemented by each of the computing devices 104 through 118. Additionally, the detect-all mode of operation to perform shared inter-operational control among multiple computing devices may be implemented by each of the computing devices 104 through 118. Ranges with respect to the detect-adjacent and detect-all operations are illustrated within FIG. 1 with respect to the computing devices 104 to avoid crowding within the drawing, though it is understood that similar ranges may exist for each computing device within FIG. 1.

It can be seen from FIG. 1 that the computing device 106 and the computing device 108 are within a detect-adjacent radius 120 from the computing device 104. The detect-adjacent range 120 represents a selectable range/distance of shared inter-operational control among multiple computing devices, as described above and in more detail below.

As can also be seen from FIG. 1, the computing device 110 through the computing device 118 are located within a detect-all radius 122 from the computing device 104. The detect-all radius 122 represents a selectable range/distance of shared inter-operational control among multiple computing devices, as described above and in more detail below.

The detect-all radius 122 may be considered more inclusive, such as for larger groups of collaborating users, relative to the detect-adjacent radius 120. In contrast, the detect-adjacent radius 120 may be considered less inclusive, such as for smaller groups of collaborating users, relative to the detect-all radius 122.

As described above, the User A through the User C are gathered around the table 102 with their respective computing devices as part of a collaborative project. As such, for purposes of the following description, interactions among the computing device 104 through the computing device 108 will be described in detail with respect to the detect-adjacent radius 120. However, it is understood that the description of these interactions within the detect-adjacent radius 120 also applies to the detect-all radius 122. As such, only differences in processing for the respective ranges will be described if and where appropriate.

As will be described in more detail below in association with FIG. 2 through FIG. 6, the computing device 104 through the computing device 118 may each provide automated shared inter-operational control among multiple computing devices. The automated shared inter-operational control among multiple computing devices is based upon detection and shared control of adjacent and further distant computing devices. It is understood that the present technology may be implemented at a user computing device or server device level (not shown), as appropriate for a given implementation. A variety of possibilities exist for implementation of the present subject matter, and all such possibilities are considered within the scope of the present subject matter.

A network or direct wireless communications (e.g., Bluetooth®) between the computing devices 104-118 may be utilized to perform the functionality described herein, and may include any form of interconnection suitable for the intended purpose, including a private or public network such as an intranet or the Internet, respectively, direct intermodule interconnection, dial-up, wireless (e.g., Bluetooth®, etc.), or any other interconnection mechanism capable of interconnecting the respective devices. As such, communications between the computing device 104 through the computing device 118 may be implemented in any manner appropriate for a given implementation of the present technology.

Figure 2:
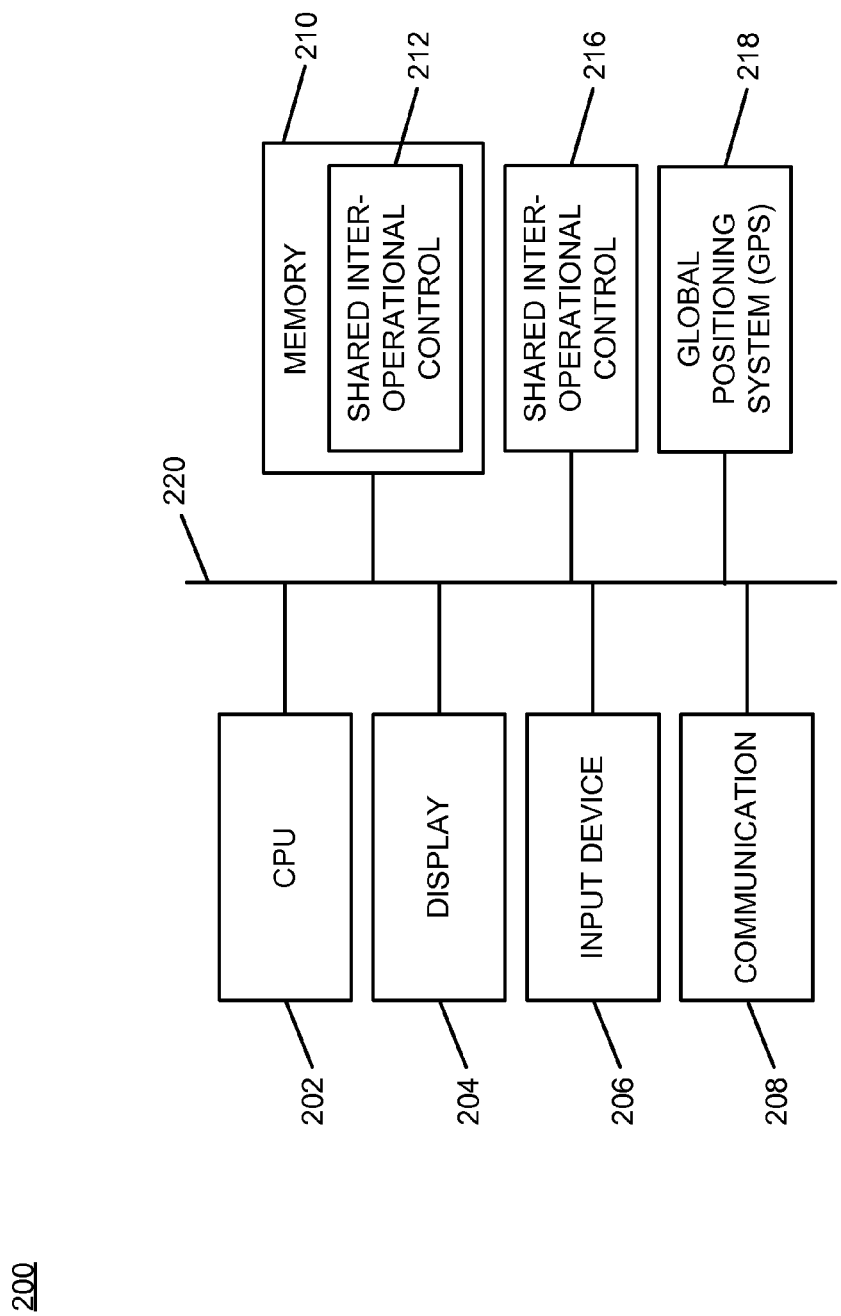
FIG. 2 is a block diagram of an example of an implementation of a core processing module capable of performing shared inter-operational control among multiple computing devices according to an embodiment of the present subject matter.

FIG. 2 is a block diagram of an example of an implementation of a core processing module 200 capable of performing shared inter-operational control among multiple computing devices. The core processing module 200 may be associated with either the computing device 104 through the computing device 118 or with a server device (not shown), as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of shared inter-operational control among multiple computing devices in association with each implementation/device. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, appropriate for a given implementation. The communication module may include infrared transmission and reception capabilities, Bluetooth® transmission and reception capabilities, and other capabilities to allow computing devices to interact and move data to perform the shared inter-operational control among multiple computing devices described herein.

A memory 210 includes a shared inter-operational control storage area 212 that stores inter-device control and data within the core processing module 200. As will be described in more detail below, inter-device control and data stored within the shared inter-operational control storage area 212 is used to allow users to interact across computing devices within a shared operational platform.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A shared inter-operational control module 214 is also illustrated. The shared inter-operational control module 214 provides inter-device control and data manipulation for the core processing module 200, as described above and in more detail below. The shared inter-operational control module 214 implements the automated shared inter-operational control among multiple computing devices of the core processing module 200, and facilitates a shared operational platform across multiple computing devices.

It should also be noted that the shared inter-operational control module 214 may form a portion of other circuitry described without departure from the scope of the present subject matter. Further, the shared inter-operational control module 214 may alternatively be implemented as an application stored within the memory 210. In such an implementation, the shared inter-operational control module 214 may include instructions executed by the CPU 202 for performing the functionality described herein. The CPU 202 may execute these instructions to provide the processing capabilities described above and in more detail below for the core processing module 200. The shared inter-operational control module 214 may form a portion of an interrupt service routine (ISR), a portion of an operating system, a portion of a browser application, or a portion of a separate application without departure from the scope of the present subject matter.

A global positioning system (GPS) module 218 provides positioning location coordinates usable for identifying adjacent computing devices under the detect-adjacent mode of operation, and additional/further distant computing devices under the detect-all mode of operation. It is further understood that other forms of identification of adjacent and further distant computing devices, such as ranging using signal strength associated with Bluetooth® or other communications may be used to perform the detect-adjacent and detect-all mode operations.

The CPU 202, the display 204, the input device 206, the communication module 208, the memory 210, the shared inter-operational control module 214, and the GPS module 218 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. Accordingly, the core processing module 200 may take many forms and may be associated with many platforms.

Figure 3:
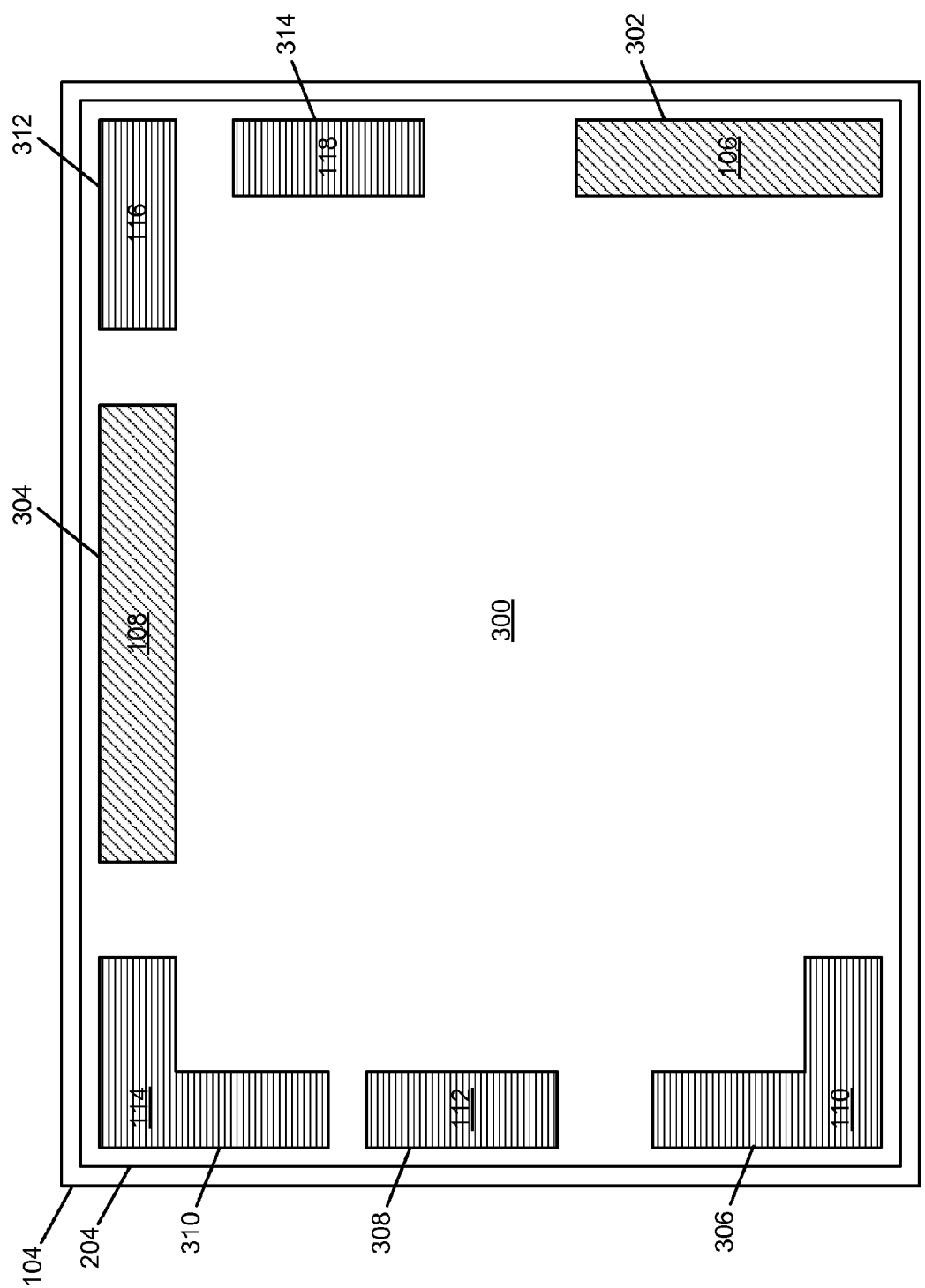
FIG. 3 is a diagram of an example of an implementation of a shared user interface for shared inter-operational control among multiple computing devices according to an embodiment of the present subject matter.

FIG. 3 is a diagram of an example of an implementation of a shared user interface 300 for shared inter-operational control among multiple computing devices. The user interface 300 is represented from a perspective within the collaborative environment 100 of the computing device 104, and the computing device 104 with its respective display 204 are illustrated for purposes of example. The user-interface control ports of other of the computing device 106 through the computing device 118 are shown, respectively, as graphical representations 302 through 314 on the shared user interface 300.

The graphical representations 302 through 314 may be presented in different colors with a unique color assigned to each representation. As described in more detail below, different colored representations of other computing devices, and cursors of the respective devices, allow interactions between computing devices to be more readily discerned from one another and from the local-device cursor on any given device. For example, the local-device cursor may be rendered in the color white with a black-line outline, while cursors of other computing devices may be rendered in the respective unique colors of the graphical representations 302 through 314, within the shared user interface 300 to allow users to discern which cursor/device is performing a particular operation within the shared user interface 300 of a given computing device.

For purposes of the present example, two different fill patterns are utilized to distinguish between devices in the detect-adjacent collaborative group from additional devices that would be a part of the detect-all collaborative group in addition to those in the detect-adjacent collaborative group. As such, and as can be seen from FIG. 3, the graphical representation 302 of the computing device 106 and the graphical representation 304 of the computing device 108 are illustrated with a diagonal-line fill as part of the detect-adjacent grouping (see FIG. 1). In contrast, the graphical representation 306 of the computing device 110 through the graphical representation 314 of the computing device 118 are illustrated with horizontal-line fill as part of the detect-all grouping (again see FIG. 1).

As can additionally be seen from FIG. 3, the respective graphical representations 302 through 314 are arranged along the perimeter of the shared user interface 300. This orientation represents a direction (horizontally) to the respective computing devices. As such, this orientation within the shared user interface 300 allows a user of the computing device 104 to further discern the respective devices based upon the respective directional orientations relative to the computing device 104.

It is understood that the shared user interface 300 may be implemented in association with each of the computing device 104 through the computing device 118, and that a different orientation/distribution of graphical representations of user-interface control ports of other computing devices may be provided on each implementation of the shared user interface 300 as appropriate for the relative positions of the respective computing devices. As such, collaborating users of the respective computing devices may utilize the shared user interface 300 to enhance productivity when controlling other devices by intuitive directional relationships between the devices as represented within the shared user interface 300.

Figure 4A:
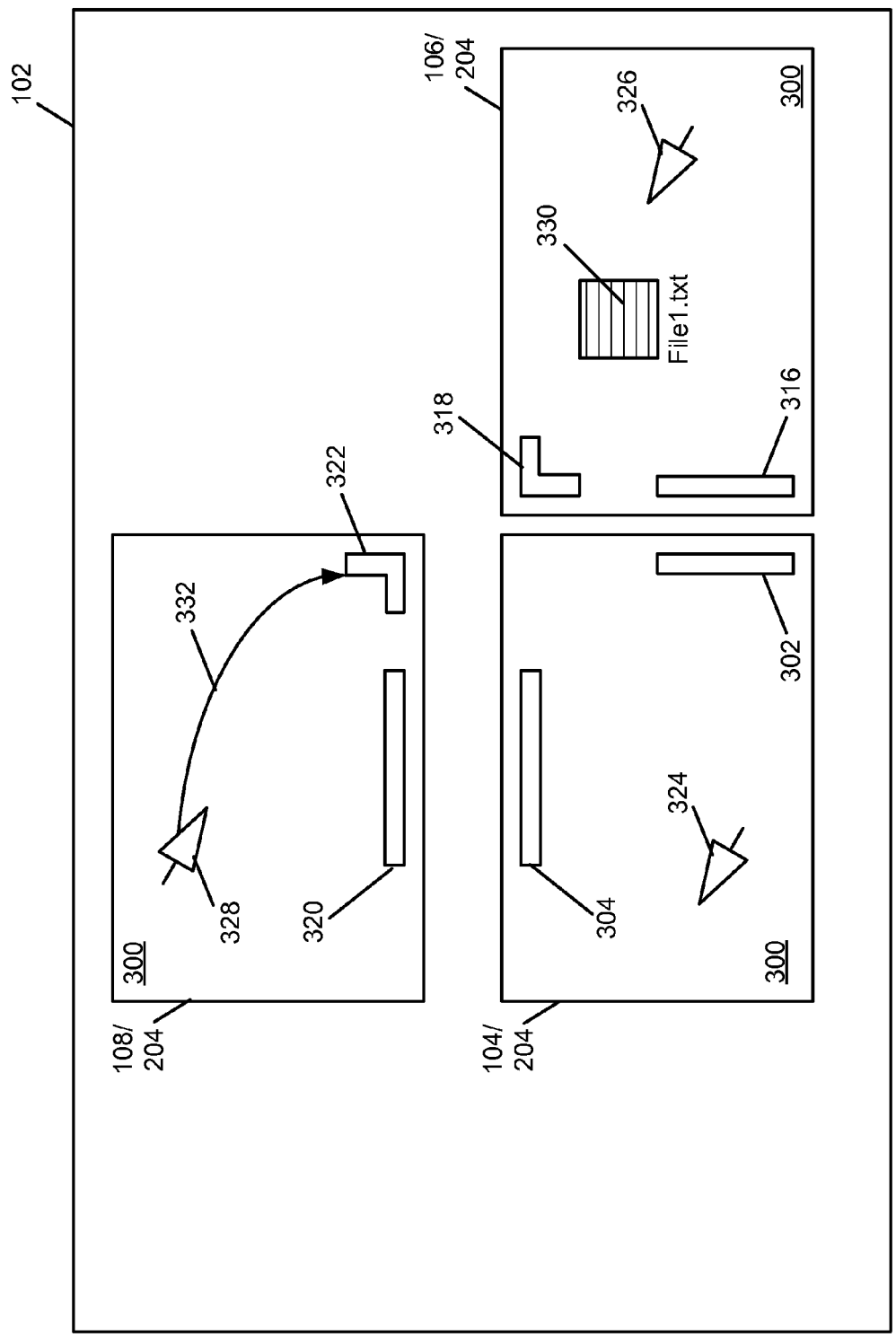
FIG. 4A is an illustration of an example of an initial orientation of a sequence of processing within an implementation of the shared user interface for shared inter-operational control among multiple computing devices implemented on three computing devices according to an embodiment of the present subject matter.
Figure 4B:
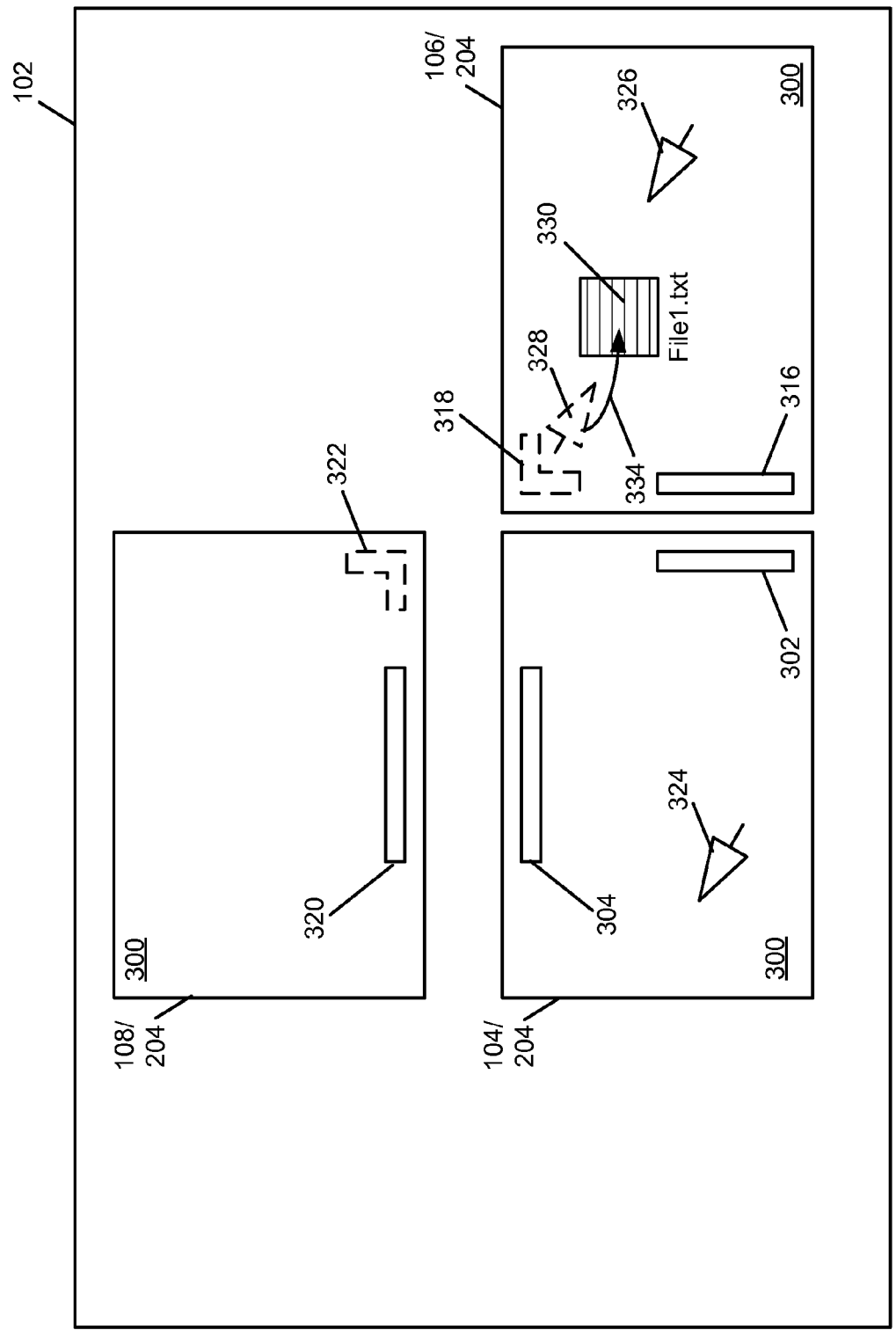
FIG. 4B is an illustration of an example of additional progression of the sequential processing within the implementation of the shared user interface for shared inter-operational control among multiple computing devices implemented on three computing devices according to an embodiment of the present subject matter.
Figure 4C:
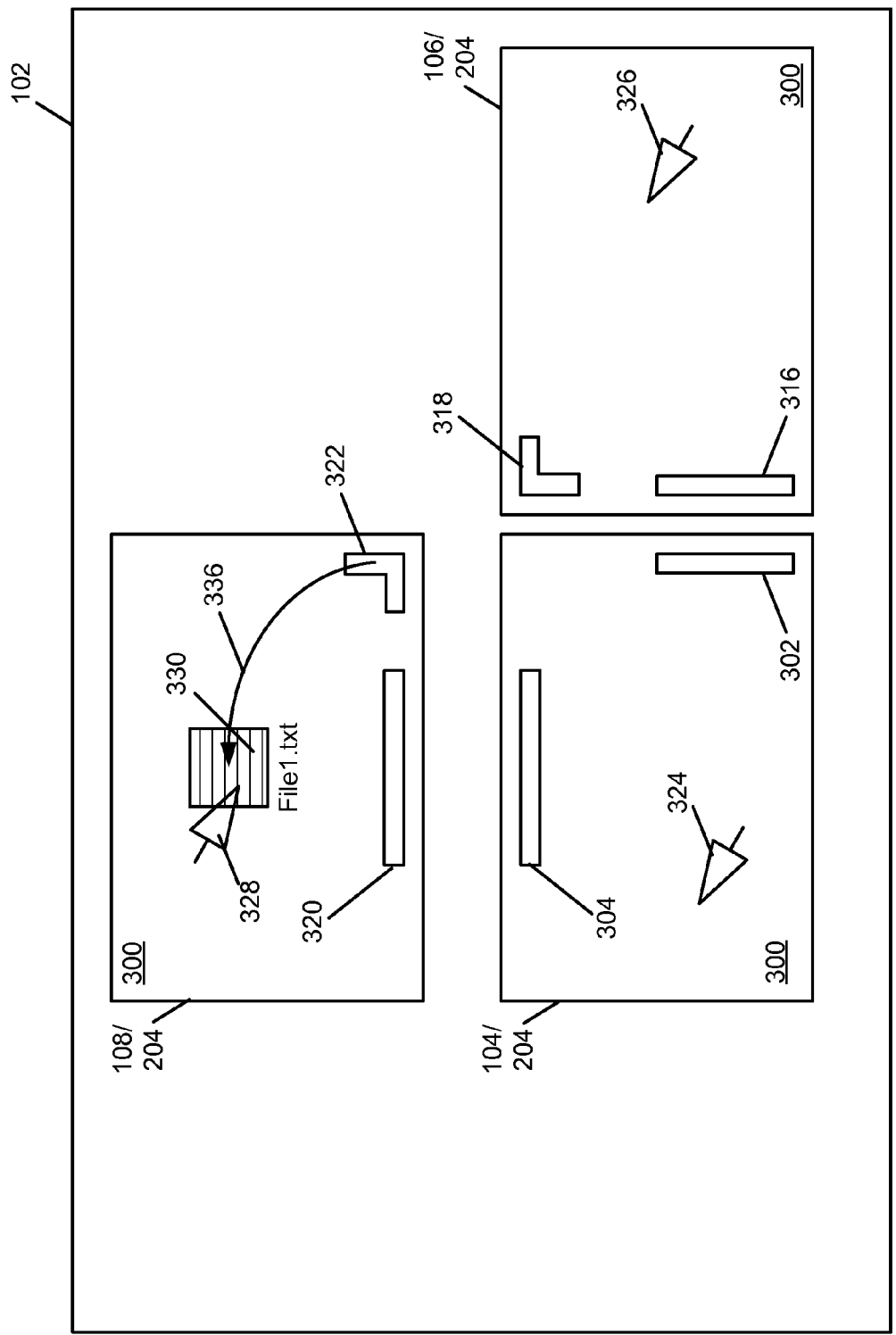
FIG. 4C is an illustration of an example of further progression of the sequential processing within the implementation of the shared user interface for shared inter-operational control among multiple computing devices implemented on three computing devices according to an embodiment of the present subject matter.

FIGS. 4A-4C illustrate a sequence of processing within an example of an implementation of the shared user interface 300 for shared inter-operational control among multiple computing devices implemented on three computing devices. Beginning with FIG. 4A, an initial orientation of the sequence is illustrated as a close-up top-view diagram of the table 102 of FIG. 1 is shown. The computing devices 104 through 108 and their respective displays 204 are also illustrated in closer detail in top-view format. As such, the computing devices may be tablet computing devices to allow the users to easily see each of the displays 204 at the same time. Alternatively, the one or more of the computing devices may be a laptop with a hinged display that is pivoted to be flat on the table 102. Keyboards and/or touchpad/mouse input devices of the respective computing devices are not illustrated. The devices may have touchscreen input devices integrated into the respective displays 204. For purposes of the present example, any form of input device may be used as appropriate for a given implementation.

The shared user interface 300 is also shown to be illustrated on each display 204. The respective computing devices 104 through 108 are further considered for purposes of the present example to be in the detect-adjacent mode. As such, other computing device user-interface control port representations of the other computing devices from FIG. 1 are not shown within the respective shared user interface 300 on the respective computing devices.

As can be seen from FIG. 4A, the graphical representation 302 and the graphical representation 304 are again illustrated on the shared user interface 300 of the computing device 104. As described above, these graphical representations 302 and 304 represent user-interface control ports that each allows authorized cursor navigation to and from the computing device 106 and 108, respectively. Similarly, the shared user interface 300 of the computing device 106 includes a graphical representation 316 that represents a user-interface control port to the computing device 104 and a graphical representation 318 that represents a user-interface control port to the computing device 108. Similarly, the shared user interface 300 of the computing device 108 includes a graphical representation 320 that represents a user-interface control port to the computing device 104 and a graphical representation 322 that represents a user-interface control port to the computing device 106. As such, each of the three collaboratively coupled computing devices include graphical representations of the collaborating computing devices and the respective user-interface control ports on the respective shared user interface 300.

As described above, each of the respective computing devices may request access to other computing devices in the collaborative group, and the respective other computing device may grant access at a granularity appropriate for the given collaboration. To further illustrate the present example, a local-device cursor 324 of the computing device 104 is illustrated on the shared user interface 300 of the computing device 104. Similarly, a local-device cursor 326 and a local-device cursor 328 are shown illustrated on the respective shared user interface 300 of the computing devices 106 and 108. Each of the local-device cursors 324 through 328 are shown to be oriented relative to the respective User A through User C that is using the respective computing devices.

A text file 330 titled "File1.txt" is shown to be situated within the shared user interface 300 of the computing device 106. For purposes of the present example, it is assumed that the User C of the computing device 108 is interested in obtaining the text file 330 from the computing device 106. As such, the User C may move the local-device cursor 328 onto the graphical representation 322 to signal the computing device 106 of the User C's interest in obtaining access to the shared user interface 300 of the computing device 106. This movement of the local-device cursor 328 onto the graphical representation 322 is represented by the arrow 332 within FIG. 4A.

In response to the User C placing the local-device cursor 328 onto the graphical representation 322, the computing device 108 signals the computing device 106 to request access to the computing device 106. The access may be granted within the collaborative group by configuration at initiation of the collaboration, or may be granted on a case-by-case basis. For a case-by-case granting of access to other devices, the respective graphical representation of the user-interface control port may be configured to flash or otherwise provide a visual identification of the access request to the User B of the computing device 106. The User B may then grant or deny the request. Within the present example, it is presumed that the User B grants access to the request from User C and the computing device 108 to access the computing device 106.

FIG. 4B shows additional progression of the sequential processing within the example of an implementation of the shared user interface 300 for shared inter-operational control among multiple computing devices implemented on three computing devices. As can be seen from FIG. 4B, the local-device cursor 328 of the computing device 108 is now shown to be moving from the graphical representation 318 of the user-interface control port of the computing device 106 toward the text file 330 as represented by the arrow 334. It should be noted, however, that while the local-device cursor 328 maintains its orientation relative to the User C of the computing device 108, the local-device cursor 328 is shown in a dashed-line format to further indicate that the local-device cursor 328 is now operating remotely from the computing device 108. It should further be noted that the local-device cursor 328 is no longer illustrated on the shared user interface 300 of the computing device 108.

As described above, the local-device cursor 328 when operated remotely from the computing device 108 may be represented in a color identical to the unique color of the graphical representation 318 on the computing device 106 (that represents the user-interface control port to the computing device 108). This color-based differentiation of user-interface control elements and user-interface control port representations allows all users to understand which user is controlling the respective element. The unique color may also be applied to the graphical representation 322 on the computing device 108. The computing device representation 318 and graphical representation 322 are also shown to be represented in a dashed-line manner to represent coincidence of coloring, though it is understood that this distinction is illustrated only with respect to these three components to reduce complexity of the drawing representations. The graphical representation 318 and the graphical representation 322 may further be visually distinguished by flashing or other emphasis/de-emphasis to represent that the local-device cursor 328 is operating remotely, and to indicate to which device it has been moved to control the other respective machine. As such, users may determine by color coding and highlighting (emphasis) where their respective local cursor has been moved.

It should further be noted that there is no "mimicking" or "replication" of displays being performed. Each display has its own unique aspects and desktop, and when a local-device cursor is moved to a neighboring device, any input controls by the user may be applied to the respective other neighboring display/device. As such, the present technology is distinguishable and is fundamentally different from prior technologies that replicate desktops. As such, the present technology may provide a true migrated device access that translates any local-device user interface controls/inputs to the target device user interface controls/inputs.

FIG. 4C shows further progression of the sequential processing within the example of an implementation of the shared user interface 300 for shared inter-operational control among multiple computing devices implemented on three computing devices. As can be seen from FIG. 4C, the local-device cursor 328 of the computing device 108 is shown as represented by an arrow 336 to have been moved back onto the shared user interface 300 of the computing device 108 with the text file 330 having been moved by a "drag" operation of the local-device cursor 328 while operating remotely from the computing device 106 to the computing device 108 again as a local device operation. It should be noted that, though not illustrated in FIG. 4C, the title of the text file 330 may also be rotated and oriented toward the User C of the computing device 108 (would be upside down in FIG. 4C if rotated). The local-device cursor 328 is again shown in solid-line form to show that the local-device cursor 328 is again operating locally to the computing device 108. It should further be noted that while the present example illustrates a "drag" operation of a file from a neighboring computing device to illustrate certain beneficial aspects of the present technology, the local-device cursor 328 may alternatively be used, such as by a right-click that controls the local-device cursor 328 over the text file 330, to invoke a pop-up menu within the shared user interface 300 on the computing device 106 to allow copying or other functionality. The user may alternatively use keystroke commands (e.g., Control-C) to invoke a copy operation from the neighboring computing device, and may then move the local-device cursor 328 back to the computing device 108 and perform a paste operation (e.g., Control-V). As an additional variation, a user that has been granted access to another computing device may open a file on the other computing device and edit the file directly on that other computing device, such as to type/enter text, draw graphics, or other editing functions. This type of "in-place" editing may further improve collaboration by allowing collaborating users to work together on a single document, and then move the refined document to other computing devices within the collaborative group. As such, users may perform functionality using a remote portion of the shared user interface 300 by manipulation of their own control devices.

As such, the sequential processing of FIGS. 4A-4C show that users of the shared user interface 300 may be granted access to other computing devices that form part of a collaborative group. It should be noted that there is no "primary" computing device within the collaborative computing device group as all of the devices may be synchronized and allowed to interact, share content, and collaborate with any other synchronized device, with multiple users sharing the given shared device space. Each device may implement the core processing modules 200 and the respective shared inter-operational control modules 214 of each computing device and may collaboratively share control of the collaboration session. The users may copy and/or move data, files, and other information between the respective computers without use of an external network/connection.

Figure 5:
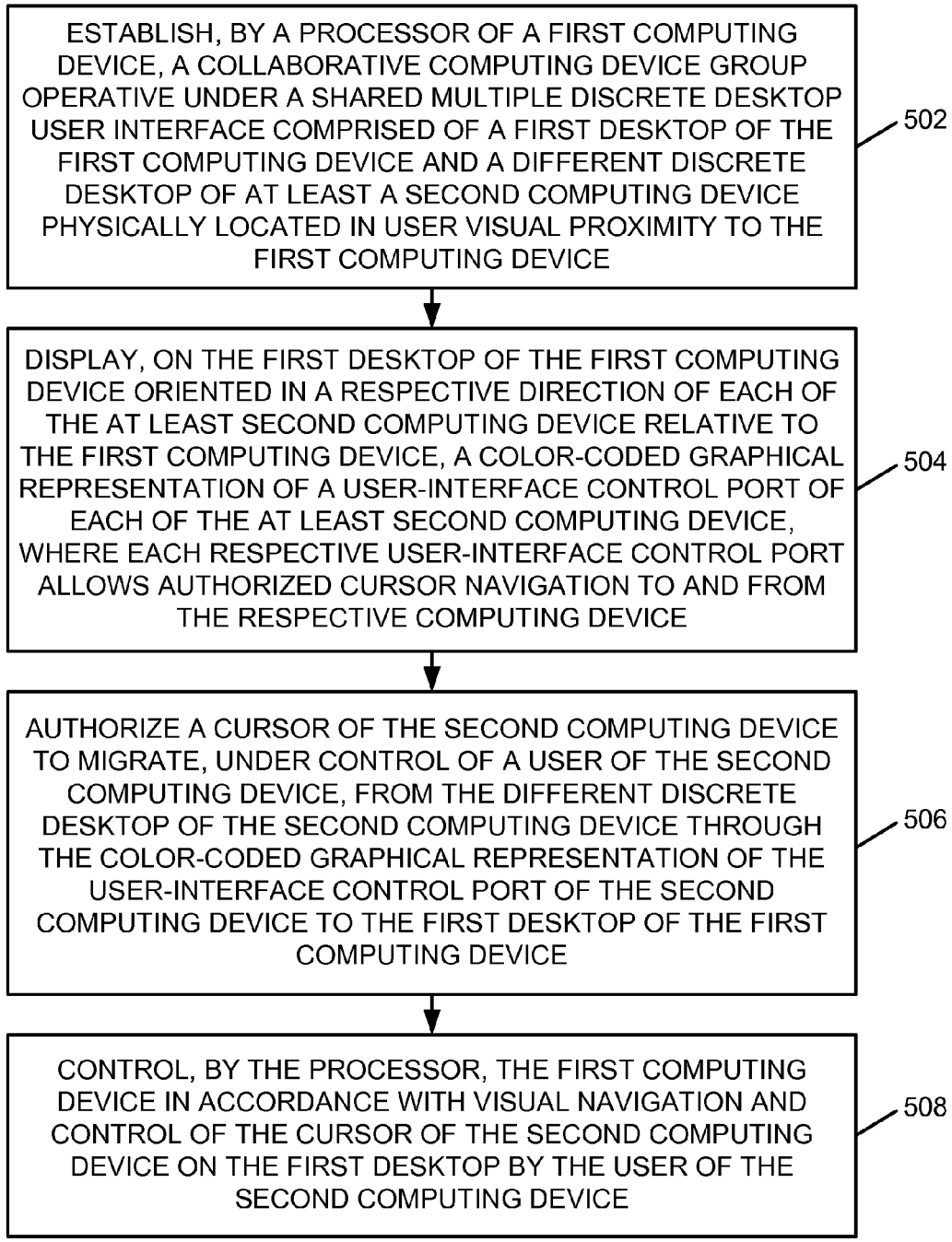
FIG. 5 is a flow chart of an example of an implementation of a process for shared inter-operational control among multiple computing devices according to an embodiment of the present subject matter.
Figure 6:
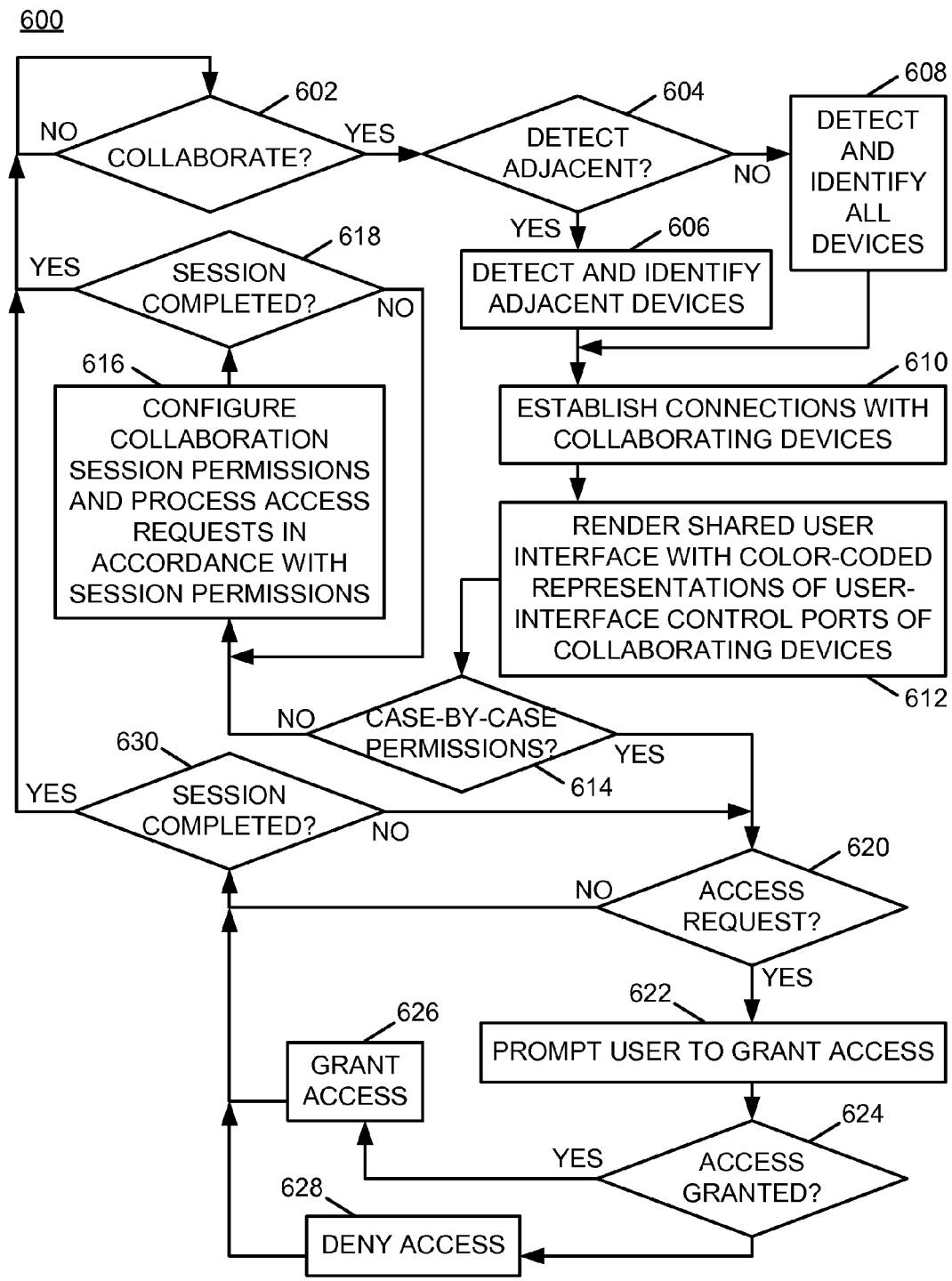
FIG. 6 is a flow chart of an example of an implementation of a process for shared inter-operational control among multiple computing devices using both case-by-case and session authorizations according to an embodiment of the present subject matter.

FIG. 5 through FIG. 6 described below represent example processes that may be executed by devices, such as the core processing module 200, to perform the automated shared inter-operational control among multiple computing devices associated with the present subject matter. Many other variations on the example processes are possible and all are considered within the scope of the present subject matter. The example processes may be performed by modules, such as the shared inter-operational control module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 5 is a flow chart of an example of an implementation of a process 500 for shared inter-operational control among multiple computing devices. At block 502, the process 500 establishes, by a processor of a first computing device, a collaborative computing device group operative under a shared multiple discrete desktop user interface comprised of a first desktop of the first computing device and a different discrete desktop of at least a second computing device physically located in user visual proximity to the first computing device. At block 504, the process 500 displays, on the first desktop of the first computing device oriented in a respective direction of each of the at least second computing device relative to the first computing device, a color-coded graphical representation of a user-interface control port of each of the at least second computing device, where each respective user-interface control port allows authorized cursor navigation to and from the respective computing device. At block 506, the process 500 authorizes a cursor of the second computing device to migrate, under control of a user of the second computing device, from the different discrete desktop of the second computing device through the color-coded graphical representation of the user-interface control port of the second computing device to the first desktop of the first computing device. At block 508, the process 500 controls, by the processor, the first computing device in accordance with visual navigation and control of the cursor of the second computing device on the first desktop by the user of the second computing device.

FIG. 6 is a flow chart of an example of an implementation of a process 600 for shared inter-operational control among multiple computing devices using both case-by-case and session authorizations. It is understood that the process 600 may be executed by multiple devices to establish and perform the shared inter-operational control among multiple computing devices. For ease of reference in the description below, references to a particular computing device without further specification of the device being another/different computing device, is intended to represent each computing device that concurrently executes the process 600. A "hosting" computing device represents a device that is referenced for a particular aspect relative to another/different computing device.

At decision point 602, the process 600 makes a determination as to whether a request to begin a collaborative computing device group session has been detected. A request to begin a collaborative computing device group session may be initiated by a user of a hosting computing device executing the process 600 to initiate shared inter-operational control with another computing device that is also capable of shared inter-operational control and that is in physical proximity to the initiating computing device.

In response to determining at decision point 602 that a request to begin a collaborative computing device group session has been detected, the process 600 makes a determination at decision point 604 as to whether to perform a detect-adjacent mode (or a detect-all mode) of shared inter-operational control. In response to determining to perform a detect-adjacent mode of shared inter-operational control, the process 600 detects and identifies adjacent computing devices that are capable of shared inter-operational control and that are in close physical proximity to (e.g., beside, in front of, etc.) the initiating computing device at block 606. The respective computing devices may be correlated within the adjacent-device collaborative computing device group.

Alternatively, in response to determining not to perform the detect-adjacent mode of shared inter-operational control at decision point 604, and to instead perform the detect-all mode of shared inter-operational control, the process 600 detects and identifies all computing devices that are capable of shared inter-operational control and that are in physical proximity to the initiating computing device at block 608. The respective computing devices may be correlated within the adjacent-device collaborative computing device group.

As an additional variation, the process 600 may display uniquely color-coded representations of user-interface control ports of each detected computing device under the detect-all mode, each oriented in a direction of the respective detected computing device relative to the hosting computing device. The process 600 may highlight a subset of the displayed color-coded representations of user-interface control ports that comprise a sub-group of computing devices identified by a detect-adjacent collaborative computing group selection option, and the user may determine, based upon the differentiated groupings, which form of collaborative device grouping to establish. In response to such a selection, the process 600 may form a collaborative computing device group from the sub-group of computing devices identified by a detect-adjacent collaborative computing group selection option, such as represented by highlighted graphical representations. As such, the process 600 differentiates between the two modes of operation for purposes of example, though it is understood as described above, that the detect-all mode may be a default with a user-selectable option to establish a collaborative group with a sub-group of computing devices identified by a detect-adjacent collaborative computing group selection option.

In response to detecting and identifying adjacent computing devices that are capable of shared inter-operational control and that are in close physical proximity to (e.g., beside, in front of, etc.) the initiating computing device at block 606, or in response to detecting and identifying all computing devices that are capable of shared inter-operational control and that are in physical proximity to the initiating computing device at block 608, the process 600 establishes communication connections with the collaborating computing devices at block 610. As described above, several forms of communication are possible, including infrared, Bluetooth®, Wi-Fi®, near field communication (NFC), geofencing, or other technologies, as appropriate for a given implementation. It is understood that network-based communications are not required to implement the present technology, and that associated delays of network communications may be thereby eliminated.

At block 612, the process 600 renders a shared user interface with color-coded graphical representations of user-interface control ports of the collaborating computing devices. As described above, the color-coded graphical representations of user-interface control ports of the collaborating computing devices may be situated around a perimeter of a display screen of the hosting (each) computing device, each in a location along the perimeter that is oriented in a respective direction of each other computing device relative to the respective hosting computing device. Further, the color-coded graphical representation of a user-interface control port of each of the at least the second computing device each allow authorized cursor navigation to and from the respective computing device(s).

At decision point 614, the process 600 makes a determination as to whether to perform case-by-case permissions with respect to device control authorizations within the collaborative computing device group (or to perform session permissions). The control authorizations may include authorizing a cursor of other computing devices to migrate, under control of users of the respective other computing devices, from the different discrete desktop of the respective other computing devices through the color-coded graphical representations of the user-interface control port of the other computing devices to the desktop of the computing device.

In response to determining at decision point 614 not to perform case-by-case permissions with respect to device control authorizations within the collaborative computing device group (e.g., to perform session permissions), the process 600 configures session collaboration permissions and processes access requests in accordance with the session permissions at block 616. As described above, the process 600 may allow the hosting computing device to be controlled in accordance with visual navigation and control of a cursor of another collaborating computing device on the desktop of the hosting computing device by a user of the other computing device. The cursor of the other computing device may be represented in a color identical to a color of the color-coded graphical representation of the user-interface control port within the desktop. Further, a cursor of the hosting computing device may be simultaneously rendered in a native cursor color of the hosting computing device to allow visual differentiation of the cursors by both users on the display of the hosting computing device.

Processing of access requests may include translating native user-interface control inputs of the other computing devices associated with the cursor of the other computing device received via the respective user-interface control port into native user-interface control inputs of the hosting computing device. As described above, the controls described herein may allow another computing device, under input controls of the other device, to perform control operations on the hosting computing device. The control operations may include moving a file from the hosting desktop of the hosting computing device to a distinct desktop on the other computing device by the user of the other computing device dragging the file onto the color-coded graphical representation of the user-interface control port of the other computing device. Alternatively, the user of the other computing device may "right-click" an icon that represents the file on the hosting desktop, and a native pop-up menu of the hosting desktop may be opened to allow the user of the other computer to perform other native device options, such as a copy operation of the file. The copied file may be pasted to the other computer by the user moving the cursor back to the other computing device, "right-clicking" again, and selecting a paste operation on the other computing device. As such, the "clipboard" of the hosting computing device may also be migrated to the other computing device in response to detection of a copy operation followed by a migration of the cursor that performed the copy operation back to the other computing device. Many other inter-device operational controls are possible and all are considered within the scope of the present description.

At decision point 618, the process makes a determination as to whether the collaboration session has been completed. In response to determining that the collaboration session has not been completed, the process 600 continues to processes access requests in accordance with the session permissions. In response to determining that the collaboration session has been completed, the process 600 returns to decision point 602 and iterates as described above.

Returning to the description of decision point 614, in response to determining to perform case-by-case permissions with respect to device control authorizations within the collaborative computing device group, (i.e., to perform case-by-case permissions with respect to device control authorizations within the collaborative computing device group), the process 600 begins iterative processing of access requests by making a determination at decision point 620 as to whether an access request has been detected. In response to determining that an access request has not been detected, the process 600 makes a determination at decision point 630 as to whether the collaboration session has been completed. In response to determining that the collaboration session has not been completed, the process 600 returns to decision point 620 and iterates as described above.

In response to determining at decision point 620 that an access request has been detected, the process 600 prompts the user to grant access to (e.g., authorize) the requesting computing device at block 622. As such, users within a collaborative computing device group may granularly control which accesses are authorized throughout the collaborative session.

At decision point 624, the process 600 makes a determination as to whether the requested access was granted. In response to determining that the requested access was granted, the process 600 grants the requested access at block 626.

For example, as described above, the process 600 may allow the hosting computing device to be controlled in accordance with visual navigation and control of a cursor of another collaborating computing device on the desktop of the hosting computing device by a user of the other computing device. The cursor of the other computing device may be represented in a color identical to a color of the color-coded graphical representation of the user-interface control port within the desktop. Further, a cursor of the hosting computing device may be simultaneously rendered in a native cursor color of the hosting computing device to allow visual differentiation of the cursors by both users on the display of the hosting computing device.

Processing of access requests may include translating native user-interface control inputs of the other computing devices associated with the cursor of the other computing device received via the respective user-interface control port into native user-interface control inputs of the hosing computing device. As described above, the controls described herein may allow another computing device, under input controls of the other device, to perform control operations on the hosting computing device. Many inter-device operational controls are possible and all are considered within the scope of the present description.

Returning to the description of decision point 624, in response to determining that the requested access was not granted, the process 600 denies the requested access at block 628. In response to either granting the requested access at block 626, or in response to denying the requested access at block 628, the process 600 makes a determination at decision point 630 as to whether the collaboration session has been completed. In response to determining that the collaboration session has been completed, the process 600 returns to decision point 602 and iterates as described above.

As such, the process 600 detects adjacent and other proximate computing devices and establishes collaborative computing device groups operative under a shared multiple discrete desktop user interface. Different color-coded representations of user-interface control port of the collaborating computing devices that each allow authorized cursor navigation to and from the respective computing device are rendered/displayed. Permissions for a collaboration session may be granularly authorized, or may be configured for the entire collaboration session.

As described above in association with FIG. 1 through FIG. 6, the example systems and processes provide shared inter-operational control among multiple computing devices. Many other variations and additional activities associated with shared inter-operational control among multiple computing devices are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A system, comprising:
    a communication module of a first computing device; and
    a processor of the first computing device programmed to:
        establish, via the communication module, a collaborative computing device group operative under a shared multiple discrete desktop user interface comprised of a first desktop of the first computing device and a different discrete desktop of at least a second computing device physically located in user visual proximity to the first computing device;
        display, on the first desktop of the first computing device oriented in a respective direction of each of the at least second computing device relative to the first computing device, a color-coded graphical representation of a user-interface control port of each of the at least second computing device, where each respective user-interface control port allows authorized cursor navigation to and from the respective computing device;
        authorize a cursor of the second computing device to migrate, under control of a user of the second computing device, from the different discrete desktop of the second computing device through the color-coded graphical representation of the user-interface control port of the second computing device to the first desktop of the first computing device;

control the first computing device in accordance with visual navigation and control of the cursor of the second computing device on the first desktop by the user of the second computing device;

detect multiple computing devices within a specified distance from the first computing device using a detect-all mode of detection;

display, on the first desktop of the first computing device, uniquely color-coded graphical representations of user-interface control ports of each of the detected multiple computing devices that each allow authorized cursor navigation to and from one respective detected computing device within the first desktop, where each uniquely color-coded graphical representation is oriented in a direction of the respective detected computing device relative to the first computing device; and highlight a subset of the displayed uniquely color-coded graphical representations of the user-interface control ports that comprise a sub-group of computing devices identified by a detect-adjacent collaborative computing group selection option; and where, in being programmed to establish, via the communication module, the collaborative computing device group operative under the shared multiple discrete desktop user interface comprised of the first desktop of the first computing device and the different discrete desktop of each of the at least second computing device physically located in user visual proximity to the first computing device, the processor is programmed to:

form the collaborative computing device group from the sub-group of computing devices identified by the detect-adjacent collaborative computing group selection option.

2. The system of claim 1, where the cursor of the second computing device comprises a color identical to a color of the color-coded graphical representation of the user-interface control port of the second computing device within the first desktop, and a cursor of the first computing device is simultaneously rendered in a native cursor color of the first computing device.

3. The system of claim 1, where the processor is further programmed to:

detect each of the at least second computing device within a specified distance from the first computing device using a detect-adjacent mode of detection; and where, in being programmed to establish, via the communication module, the collaborative computing device group operative under the shared multiple discrete desktop user interface comprised of the first desktop of the first computing device and the different discrete desktop of each of the at least second computing device physically located in user visual proximity to the first computing device, the processor is programmed to:

establish the collaborative computing device group as an adjacent-device collaborative computing device group comprised of the at least second computing device detected as adjacent using the detect-adjacent mode of detection, where authorized inter-device access controls are limited to device interactions among the adjacent-device collaborative computing device group.

4. The system of claim 1, where, in being programmed to control the first computing device in accordance with the visual navigation and control of the cursor of the second computing device on the first desktop by the user of the second computing device, the processor is programmed to:

translate native user-interface control inputs associated with the cursor of the second computing device received via the user-interface control port into native user-interface control inputs of the first computing device.

5. The system of claim 1, further comprising the second computing device, under input controls of the second computing device, moving a file from the first desktop of the first computing device to the different discrete desktop of the second computing device by the user of the second computing device dragging the file onto the color-coded graphical representation of the user-interface control port of the second computing device displayed on the first desktop of the first computing device.

6. A computer program product, comprising:

a computer readable storage medium having computer readable program code embodied therewith, where the computer readable program code when executed on a computer causes the computer to:

establish a collaborative computing device group operative under a shared multiple discrete desktop user interface comprised of a first desktop of the computer and a different discrete desktop of at least a second computing device physically located in user visual proximity to the computer;

display, on the first desktop of the computer oriented in a respective direction of each of the at least second computing device relative to the computer, a color-coded graphical representation of a user-interface control port of each of the at least second computing device, where each respective user-interface control port allows authorized cursor navigation to and from the respective computing device;

authorize a cursor of the second computing device to migrate, under control of a user of the second computing device, from the different discrete desktop of the second computing device through the color-coded graphical representation of the user-interface control port of the second computing device to the first desktop of the computer;

control the computer in accordance with visual navigation and control of the cursor of the second computing device on the first desktop by the user of the second computing device;

detect multiple computing devices within a specified distance from the computer using a detect-all mode of detection;

display, on the first desktop of the computer, uniquely color-coded graphical representations of user-interface control ports of each of the detected multiple computing devices that each allow authorized cursor navigation to and from one respective detected computing device within the first desktop, where each uniquely color-coded graphical representation is oriented in a direction of the respective detected computing device relative to the computer; and highlight a subset of the displayed uniquely color-coded graphical representations of the user-interface control ports that comprise a sub-group of computing devices identified by a detect-adjacent collaborative computing group selection option; and where, in causing the computer to establish the collaborative computing device group operative under the shared multiple discrete desktop user interface comprised of the first desktop of the computer and the different discrete desktop of each of the at least second computing device physically located in user visual proximity to the computer, the computer readable program code when executed on the computer causes the computer to:
form the collaborative computing device group from the sub-group of computing devices identified by the detect-adjacent collaborative computing group selection option.

7. The computer program product of claim 6, where the cursor of the second computing device comprises a color identical to a color of the color-coded graphical representation of the user-interface control port of the second computing device within the first desktop, and a cursor of the computer is simultaneously rendered in a native cursor color of the computer.

8. The computer program product of claim 6, where the computer readable program code when executed on the computer further causes the computer to:
detect each of the at least second computing device within a specified distance from the computer using a detect-adjacent mode of detection; and
where, in causing the computer to establish the collaborative computing device group operative under the shared multiple discrete desktop user interface comprised of the first desktop of the computer and the different discrete desktop of each of the at least second computing device physically located in user visual proximity to the computer, the computer readable program code when executed on the computer causes the computer to:
establish the collaborative computing device group as an adjacent-device collaborative computing device group comprised of the at least second computing device detected as adjacent using the detect-adjacent mode of detection, where authorized inter-device access controls are limited to device interactions among the adjacent-device collaborative computing device group.

9. The computer program product of claim 6, where, in causing the computer to control the computer in accordance with the visual navigation and control of the cursor of the second computing device on the first desktop by the user of the second computing device, the computer readable program code when executed on the computer causes the computer to:
translate native user-interface control inputs associated with the cursor of the second computing device received via the user-interface control port into native user-interface control inputs of the computer.

10. The computer program product of claim 6, further comprising the second computing device, under input controls of the second computing device, moving a file from the first desktop of the computer to the different discrete desktop of the second computing device by the user of the second computing device dragging the file onto the color-coded graphical representation of the user-interface control port of the second computing device displayed on the first desktop of the computer.

* * * * *